UNITED STATES PATENT OFFICE.

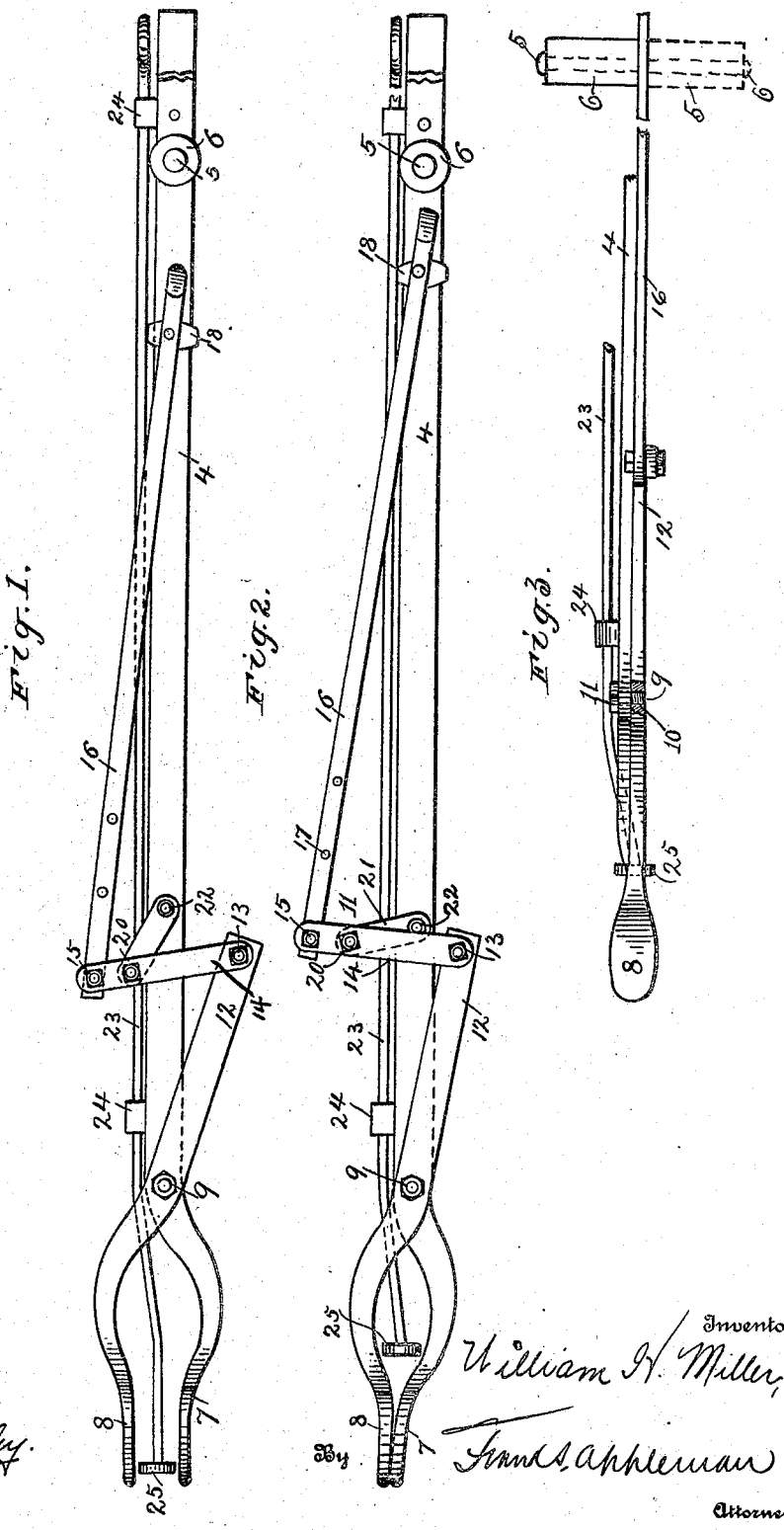

WILLIAM H. MILLER, OF BRIDGEWATER, VIRGINIA.

PLANT-PULLING IMPLEMENT.

941,644.  Specification of Letters Patent.  Patented Nov. 30, 1909.

Application filed March 16, 1909. Serial No. 483,806.

*To all whom it may concern:*

Be it known that I, WILLIAM H. MILLER, a citizen of the United States of America, residing at Bridgewater, in the county of Rockingham and State of Virginia, have invented certain new and useful Improvements in Plant-Pulling Implements, of which the following is a specification.

This invention relates to harrows and diggers and particularly to a weed puller and cotton thinner of the "tongs" type.

An object of this invention is to provide a weed puller and cotton thinner having jaws and novel means for operating one of the jaws with relation to a stationary jaw, means being provided whereby the clamping action of the jaws is increased in proportion to the pull exerted on the plant.

A further object of this invention is to provide novel means for increasing the leverage exerted on the movable jaw and for controlling the link connecting the operating rod with the inner end of the movable jaw.

A still further object of this invention is to provide novel means for permitting the adjustment of a handle by which the device is carried and for adjusting the operating rod with relation to the link in order that the device may be used by a tall or short person with equal facility, that is to say the adjustment can be effected without changing the relation of the outer end of the operating rod with relation to the handle.

A still further object of this invention is to produce an implement of the character noted and in connection therewith novel means for removing the earth which may accumulate between the jaws, the said device having an extension leading to a point near the handle utilized for carrying the implement.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1, illustrates a view in elevation of a weed puller and cotton thinner embodying the invention; Fig. 2, illustrates a detail view showing the jaws and jaw operating mechanism in a slightly different position; and Fig. 3, illustrates a detail view.

In these drawings 4, denotes a handle bar having a series of apertures designed to receive the shank 5, of a handle 6, in order that the said handle may be secured at the different positions of adjustment heretofore indicated and the said bar terminates in a curved jaw 7, which is designed to coact with the movable jaw 8, which jaw is mounted on the pivot 9, preferably threaded in an aperture 10, of the stationary jaw. The end of the pivot is provided with a nut 11, in order to prevent movement of the pivot. The jaw has an extension 12, extending inwardly beyond the pivot and said extension is apertured to receive a pivot 13, to which a link 14, is connected and the opposite end of said link is apertured to receive a pivot 15, to which the operating bar 16, is connected. The operating bar is provided with a series of apertures 17, in order that the pivot may be applied to either of said apertures for the purpose of adjusting the bar with relation to the link and in order that the inner end of the bar may be in operative relation to the handle heretofore described.

As shown in dotted lines, the handle may be double, that is to say one handle may project from one side of the bar 4, and the other handle may project in a diametrically opposite direction therefrom and this may be convenient where both hands of the operator are required for manipulating the puller. The inner end of the operating bar is provided with a plate 18, which has its ends bent to embrace the edge of the handle bar so that said plate is slidable on the handle bar and acts as a guide for the operating rod.

Intermediate the ends of the link, an aperture is formed designed to receive a pin 20, carried by the pivoted arm 21, which arm is pivoted on a stud 22, applied to the handle bar. Instead of a stud being used as indicated, a bolt, screw, or other member may be utilized as a support for the arm.

It will be observed by reference to the drawings that as the operating bar is moved approximately longitudinally with a thrust like action, motion is communicated to the link and the link in turn communicates motion to the arm and the arm is oscillated. As the arm moves to assume a position more nearly parallel with the handle bar, the extension of the movable jaw is forced away from the stationary jaw, whereas when the operating rod is moved in an opposite direction, the arm assumes a position nearly at right angles to the length of the handle bar in which position the inner end of the movable jaw is drawn more nearly parallel with the operating bar and the movable jaw is forced into engagement with a plant, weed, or the like, thus binding the said plant, weed, or the like, against the stationary jaw. By increasing the pull on the operating rod, pressure of the movable jaw is increased and disengagement of the jaws from the vegetation operated on will be prevented.

In order to dislodge dirt from the jaws, I find it desirable to employ a thrust rod 23, which is slidable in the guides 24. The inner end of the thrust rod is provided with a loop or other device for the hand of an operator, and the outer end of said thrust rod is provided with a head 25 designed to pass between the jaws and to dislodge earth which has accumulated therebetween.

The relation of the pivot of the arm, the pivot of the link and arms, and the other parts of the device, is such that the movable jaw is in contact with the stationary jaw prior to the time the pivot on the outer end of the arm is in line with the pivot on which the arm oscillates.

I claim—

1. In a plant pulling implement, a handle bar having a jaw, a jaw movable with relation thereto, the movable jaw having an extension beyond the pivot, a link pivotally connected to the extension, an operating rod pivotally connected to the link, and an arm pivoted on the handle bar and having its outer end pivotally connected to the link.

2. In a plant pulling implement, a handle bar having a jaw, a jaw movable with relation thereto, the movable jaw having an extension beyond the pivot, a link pivotally connected to the extension, an operating rod pivotally connected to the link, an arm pivoted on the handle bar and having its outer end pivotally connected to the link, a handle on the handle bar, means for permitting the adjustment of the operating rod on the link, and means for permitting movement of the handle on the handle bar whereby the parts may be adjusted and the said rod and handle are maintained in the same relative position to each other.

3. In a plant pulling implement, a handle bar having a jaw, a jaw movable with relation thereto, the movable jaw having an extension beyond the pivot, a link pivotally connected to the extension, an operating rod pivotally connected to the link, an arm pivoted on the handle bar and having its outer end pivotally connected to the link, a handle on the handle bar, means for permitting the adjustment of the operating rod on the link, means for permitting movement of the handle on the handle bar whereby the parts may be adjusted and the said rod and handle are maintained in the same relative position to each other, and a thrust rod slidable with relation to the handle bar.

4. In a plant pulling implement, a handle bar having a jaw, a jaw pivoted with relation thereto, said jaw having an extension, a link pivoted to the extension, an operating rod pivoted to the link, an arm swingingly mounted with relation to the handle bar, and means for connecting the outer end of said arm to the link, the said arm acting to control the link.

In testimony whereof, I affix my signature in the presence of two witnesses.

WILLIAM H. MILLER.

Witnesses:
JAS. R. SHIPMAN,
OTHO W. MILLER.